United States Patent [19]

Lacour et al.

[11] Patent Number: 4,509,174
[45] Date of Patent: Apr. 2, 1985

[54] CAPACITOR DISCHARGE EXCITED GAS LASER

[75] Inventors: Bernard Lacour, Marcoussis; Marc Maillet, Massy; Chantal Vannier, Saint Michel sur Orge; Olivier de Witte, Gif sur Yvette, all of France

[73] Assignee: Compagnie Generale d'Electricite, Paris, France

[21] Appl. No.: 457,536

[22] Filed: Jan. 12, 1983

[30] Foreign Application Priority Data

Jan. 14, 1982 [FR] France .................................. 82 00526

[51] Int. Cl.$^3$ .............................................. H01S 3/097
[52] U.S. Cl. ........................................ 372/82; 372/55; 372/87
[58] Field of Search .......................... 372/82, 55, 81, 87

Primary Examiner—William L. Sikes
Assistant Examiner—Leon Scott, Jr.
Attorney, Agent, or Firm—Sughrue, Mion, Zinn, Macpeak & Seas

[57] ABSTRACT

The laser comprises a gas-filled channel (51) extending between a pair of metal plates (2 and 3). The laser is excited by a spark discharge through the gas from one plate to the other. The energy for the spark comes form a pair of built-in capacitors extending between the plates on either side of the channel. The plates constitute the plates of the capacitors, and apart from a plastic retaining wall (37, 39) round each capacitor, the capacitor dielectric is water. The water is advantageously pumped (47) round a cooling circuit (48), and it is not permanently damaged if an accidental discharge takes place through the water. The invention is particularly applicable to nitrogen and to excimer lasers.

5 Claims, 1 Drawing Figure

U.S. Patent   Apr. 2, 1985   4,509,174
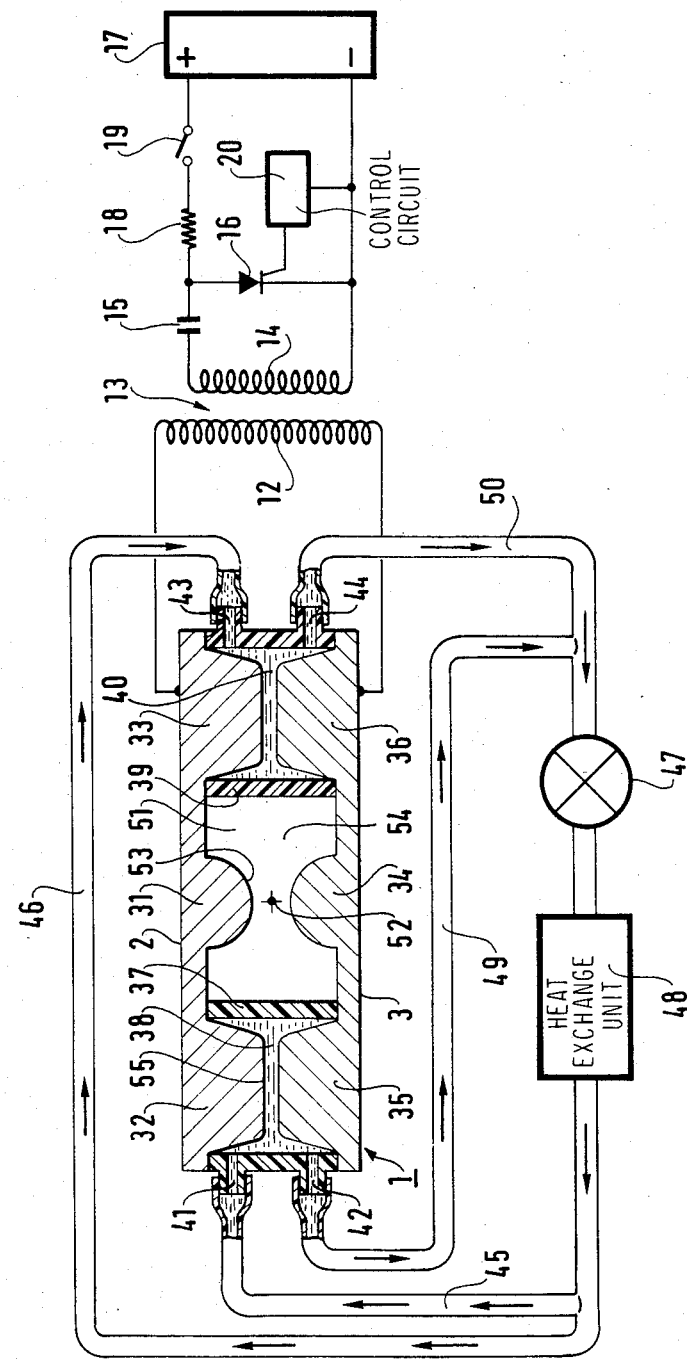

4,509,174

CAPACITOR DISCHARGE EXCITED GAS LASER

The present invention relates a gas laser which is excited by capacitors discharging.

BACKGROUND OF THE INVENTION

French patent application No. 2 500 220 published on the 20th of Aug. 1982 describes a gas laser which comprises:
- a pair of metal plates which face each other and which are substantially parallel;
- a pair of dielectric members placed side by side between said pair of plates, said members being fixed to the plates in such a manner as to form two capacitors connected in parallel, with the space between said dielectric members and said plates constituting a channel having an axis and containing a gaseous active medium, and with the middle portions of the plates which are in contact with the active medium forming respective electrodes;
- a resonant optical cavity disposed along the axis containing the active medium; and
- a charging circuit comprising:
  - a transformer having a primary winding connected in series with a capacitance, and a secondary winding having its ends connected to respective ones of said plates;
  - a source of electric current capable of charging said capacitance; and
  - means for causing the capacitance to discharge through the primary winding, thereby inducing a current in the secondary winding capable of charging said capacitors in order to establish an electric discharge between the electrodes, said discharge serving to excite the active gaseous medium to form a laser beam.

In this gas laser, the dielectric members of the capacitors may be constituted by piezoelectric dielectrics.

Preferred embodiments of the present invention improve said gas laser in such a manner as to increase its reliability.

SUMMARY OF THE INVENTION

The present invention provides a capacitor discharge excited gas laser comprising:
- a pair of metal plates which face each other, with each plate having a middle portion situated between two adjacent end portions;
- a pair of dielectric members disposed between said pair of plates on either side of said middle portions and in contact with said end portions to form, together with the plates, two parallel connected capacitors, the space between said dielectric members and said plates constituting a channel having an axis and containing a gaseous active medium, and the middle portions of the plates which are in contact with the active medium forming respective electrodes;
- a resonant optical cavity disposed along the axis containing the active medium; and
- a charging circuit comprising:
  - a transformer having a primary winding connected in series with a capacitance, and a secondary winding having its ends connected to respective ones of said plates;
  - a source of electric current capable of charging said capacitance; and
  - means for causing the capacitance to discharge through the primary winding, thereby inducing a current in the secondary winding capable of charging said capacitors in order to establish an electric discharge between the electrodes, said discharge serving to excite the active gaseous medium to form a laser beam;

the improvement wherein each of said dielectric members comprises an insulating wall disposed perpendicularly to said plates and enclosing a volume between the corresponding pair of facing end portions, and water filling said enclosed volume.

BRIEF DESCRIPTION OF THE DRAWING

An embodiment of the invention is described by way of example with reference to the sole FIGURE of the accompanying drawing which is a diagrammatic cross section through a gas laser embodying the invention.

MORE DETAILED DESCRIPTION

In the FIGURE, the body 1 of a laser is shown in cross section, and comprises two facing rectangular metal plates 2 and 3, eg. made of steel. The faces of the plates on the outside of the laser body 1 are substantially parallel to each other. Each plate comprises a middle portion situated between a pair of end portions adjacent thereto. Thus the plate 2 comprises a middle portion 31 situated between a pair of end portions 32 and 33, while the plate 3 comprises a middle portion 34 situated between a pair of end portions 35 and 36. An insulating wall 37 is disposed perpendicularly to the plates and surrounds the space lying between the end portions 32 and 35 of the plates 2 and 3 thereby creating a chamber 38. Similarly, an insulating wall 39 is disposed perpendicularly to the plates and surrounds the space lying between the end portions 33 and 36 of the plates 2 and 3 thereby creating a chamber 40. The walls 37 and 39 are made of plastics material, for example.

The end portions 32, 33, 35 and 36 of the plates 2 and 3 preferably include flat topped projections, eg. the projection 55 projecting from the portion 32, which project into the enclosed volume and which terminate in flat tops which lie parallel to the outside faces of the laser body 1, whereby the average distance between the plates is less inside the chambers 38 and 40 than it is between the middle portions 31 and 34.

A longitudinal channel 51 having an axis 52 perpendicular to the plane of the FIGURE extends between the middle portions 31 and 34 and between the walls 37 and 39. The middle portions 31 and 34 of the plates 2 and 3 also have respective projections, eg. the projection 53, but they are rounded being the form of part cylinders having axes lying parallel to the said axis 52. The rounded projections project into the channel 51 to constitute a pair of facing electrodes.

A resonant optical cavity is disposed along the axis 52. The cavity may include a pair of mirrors such as 54 glued to opposite ends of the channel 51 to close it. One of the mirrors is totally reflecting while the other is partially transparent to let the laser beam pass through.

Through the surfaces of the walls 37 and 39 on the outside of the laser body 1, there are pairs of openings 41 and 42, and 43 and 44 respectively.

The openings 41 and 43 are connected via pipes 45 and 46 to the upstream side of device which includes a circulation pump 47 connected in series with a heat exchange unit 48. The downstream side of said device is connected via pipes 49 and 50 to the openings 42 and 44 respectively.

A transformer 13 has a secondary winding 12 with its ends connected to respective ones of the metal plates 2 and 3. The transformer also has a primary winding 14 having one end connected to one terminal of a capacitance 15 whose other terminal is connected to the anode of a thyristor 16 whose cathode is connected to the other end of the primary winding 14. The connection between the capacitance 15 and the thyristor 16 is connected via a load resistance 18 and a switch 19 to the positive terminal of an electric current source 17. The negative terminal of the source 17 is connected to the cathode of the thyristor 16. A control circuit 20 has two control leads connected respectively to the cathode and to a control electrode of the thyristor 16.

The laser described above and shown in the FIGURE operates as follows:

The inside volume of the channel 51 is filled with a laser active gas, eg. a mixture of sulphur hexafluoride($SF_6$) and nitrogen.

The inside volume of the chambers 38 and 40, together with the inside volume of the cooling and pumping device 45 to 50 is filled with water. The water contained in the chambers 38 and 40 is in contact with the plates 2 and 3 and constitutes the dielectric of two capacitors connected in parallel.

Once the voltage between the plates 2 and 3 reaches the discharge voltage between the laser electrodes, a discharge is established between the electrodes causing laser radiation to oscillate in the cavity, thereby giving rise to a laser pulse which leaves the cavity via the partially transparent mirror.

The pump 47 is started to cause the water to circulate through the chambers 38 and 40. The heat exchanger 48 keeps the circulating water cool.

As in the gas laser described in the above-mentioned French patent application No. 2 500 220, the discharge between the electrodes is controlled by means of a circuit which does not have a spark gap. Because of the low discharge impedance of the capacitors which are integrated into the body of the laser, a homogeneous discharge is obtained between the electrodes even though the rise time of the voltage between the electrodes is relatively long. This result is surprising in the face of the generally held view that an extremely short voltage rise time between the electrodes is necessary in order to obtain a homogeneous discharge in nitrogen or in excimer lasers. This view is illustrated, for example, in the American article "Necessary conditions for the homogeneous formation of pulsed avalanche discharges at high gas pressures" by J. I. Levatter et al, in The Journal of Applied Physics, 51 (1), January 1980, pages 210 to 222.

The use of water as dielectric in the capacitors in accordance with the invention provides several advantages:

The reliability of the laser is increased since the water dielectric is not damaged by accidental discharges through the dielectric.

Further, the laser may be operated at a very high repetition rate provided that the water is cooled.

Finally, water capacitors are particularly well adapted to pulse charging over a period of 1 to 10 microseconds, which is very easily provided by means of the electric circuit described above.

The present invention is particularly applicable to providing lasers whose active gases are nitrogen, or a mixture of halogens and rare gases.

We claim:

1. A capacitor discharge excited gas laser comprising:
a pair of metal plates which face each other, with each plate having oppositely facing a middle portion situated between two adjacent end portions;
a pair of dielectric members disposed between said pair of plates on either side of said middle portions and in contact with said end portions to form, together with the plates, two parallel connected capacitors, the space between said dielectric members and said plates constituting a channel having an axis and containing a gaseous active medium, and the middle portions of the plates which are in contact with the active medium forming respective electrodes;
a resonant optical cavity disposed along the axis containing the active medium; and
a charging circuit comprising:
a transformer having a primary winding connected in series with a capacitance, and a secondary winding having its ends connected to respective ones of said plates;
a source of electric current capable of charging said capacitance; and
means for causing the capacitance to discharge through the primary winding, thereby inducing a current in the secondary winding capable of charging said capacitors in order to establish an electric discharge between the electrodes, said discharge serving to excite the active gaseous medium to form a laser beam;
the improvement wherein each of said dielectric members comprises an insulating wall disposed perpendicularly to said plates and enclosing a volume between the corresponding pair of facing end portions, and water filling said enclosed volume.

2. A gas laser according to claim 1, wherein the end portions in contact with the water include oppositely facing flat topped projections projecting into the volume of the water-containing chambers in such a manner that the average distance between the plates inside the chambers is less than the average distance between the plates in the channel.

3. A gas laser according to claim 1, wherein at least one of the electrodes includes a rounded projection projecting into the volume of the channel.

4. A gas laser according to claim 1, including a circuit for circulating the water contained in the chambers, each chamber insulation wall having an inlet opening and an outlet opening for connection in said circuit.

5. A gas laser according to claim 4, further including means for cooling the circulating water.

* * * * *